(12) United States Patent
Travis

(10) Patent No.: US 7,597,038 B2
(45) Date of Patent: Oct. 6, 2009

(54) LOAD REDUCING STORES LAUNCH TUBE

(75) Inventor: Matt H. Travis, Fall City, WA (US)

(73) Assignee: The Boeing Company, Chicago, IL (US)

( * ) Notice: Subject to any disclaimer, the term of this patent is extended or adjusted under 35 U.S.C. 154(b) by 133 days.

(21) Appl. No.: 11/701,304

(22) Filed: Jan. 31, 2007

(65) Prior Publication Data

US 2008/0178729 A1 Jul. 31, 2008

(51) Int. Cl.
*B64D 1/04* (2006.01)
*F41A 21/00* (2006.01)
*F42B 10/56* (2006.01)

(52) U.S. Cl. ............... 89/1.51; 89/1.53; 89/1.54; 89/29; 89/1.35; 89/1.801; 89/1.802; 89/1.804; 102/386; 102/395; 102/342; 102/357

(58) Field of Classification Search ............... 89/1.51, 89/1.53, 1.54, 29, 1.35, 1.801, 1.802, 1.804; 102/386, 395, 342, 357
See application file for complete search history.

(56) References Cited

U.S. PATENT DOCUMENTS

| | | | | |
|---|---|---|---|---|
| 4,069,761 A * | 1/1978 | Jimenez | ............... | 102/342 |
| 4,263,835 A * | 4/1981 | Dragonuk | ............... | 89/1.51 |
| 4,333,384 A * | 6/1982 | Arnold | ............... | 89/1.803 |
| 4,441,674 A * | 4/1984 | Holtrop | ............... | 244/137.4 |
| 4,475,436 A * | 10/1984 | Campbell | ............... | 89/1.804 |
| 4,498,368 A * | 2/1985 | Doane | ............... | 89/1.817 |
| 4,608,907 A * | 9/1986 | Ellis et al. | ............... | 89/1.815 |
| 4,637,292 A * | 1/1987 | Peterson | ............... | 89/1.804 |
| 4,642,928 A * | 2/1987 | Bertiller et al. | ............... | 42/77 |
| 4,681,013 A * | 7/1987 | Farley et al. | ............... | 89/1.815 |
| 4,791,854 A * | 12/1988 | Banicevic | ............... | 92/5 R |
| 4,850,553 A * | 7/1989 | Takata et al. | ............... | 244/137.4 |
| 4,944,226 A * | 7/1990 | Wedertz et al. | ............... | 102/476 |
| 4,962,798 A * | 10/1990 | Ferraro et al. | ............... | 244/137.1 |
| 4,964,595 A * | 10/1990 | Nordhaus | ............... | 244/137.4 |
| 4,974,796 A * | 12/1990 | Carr et al. | ............... | 244/137.1 |
| 5,029,776 A * | 7/1991 | Jakubowski et al. | ............... | 244/137.4 |
| 5,222,996 A * | 6/1993 | Marshall et al. | ............... | 244/137.4 |
| 5,359,917 A * | 11/1994 | Travor | ............... | 89/1.51 |
| 5,365,913 A * | 11/1994 | Walton | ............... | 124/75 |
| 5,429,053 A * | 7/1995 | Walker | ............... | 102/342 |
| 5,904,323 A * | 5/1999 | Jakubowski et al. | ............... | 244/137.4 |
| 6,073,886 A * | 6/2000 | Jakubowski et al. | ............... | 244/137.4 |
| 6,234,062 B1 * | 5/2001 | Griffin | ............... | 92/23 |

(Continued)

*Primary Examiner*—Bret Hayes
*Assistant Examiner*—Michael D David
(74) *Attorney, Agent, or Firm*—Toler Law Group

(57) ABSTRACT

An exemplary stores launch tube includes an outer tube and an inner tube. The inner tube is disposed interior the outer tube and is configured to reduce load as a store exits therefrom. The inner tube may be made of a flexible material. At least one load-reducing device may be disposed between the inner tube and the outer tube. The inner tube may be received within a canister that has an outer casing that is attachable to the outer tube. Alternately, the inner tube may be attached directly to the outer tube. The inner tube may include more than one tube section. If desired, filler material, such as foam, may be disposed between the inner tube and the outer tube. The outer tube may have a substantially circular cross-section, or an oval cross-section, or any cross-section as desired to accommodate structural considerations.

25 Claims, 17 Drawing Sheets

U.S. PATENT DOCUMENTS

| | | | |
|---|---|---|---|
| 6,318,230 B1 * | 11/2001 | Bamber | 89/14.5 |
| 6,481,669 B1 * | 11/2002 | Griffin | 244/137.4 |
| 6,499,407 B2 * | 12/2002 | Brum | 102/505 |
| 6,591,534 B1 * | 7/2003 | Trudeau et al. | 42/75.02 |
| 6,619,178 B1 * | 9/2003 | Fransson et al. | 89/1.51 |
| 6,679,454 B2 | 1/2004 | Olsen et al. | |
| 7,062,875 B1 * | 6/2006 | Stevens et al. | 42/77 |
| 7,093,802 B2 | 8/2006 | Pitzer et al. | |
| 7,421,934 B1 * | 9/2008 | Madulka et al. | 89/29 |
| 2002/0189432 A1 * | 12/2002 | Facciano et al. | 89/1.801 |

* cited by examiner

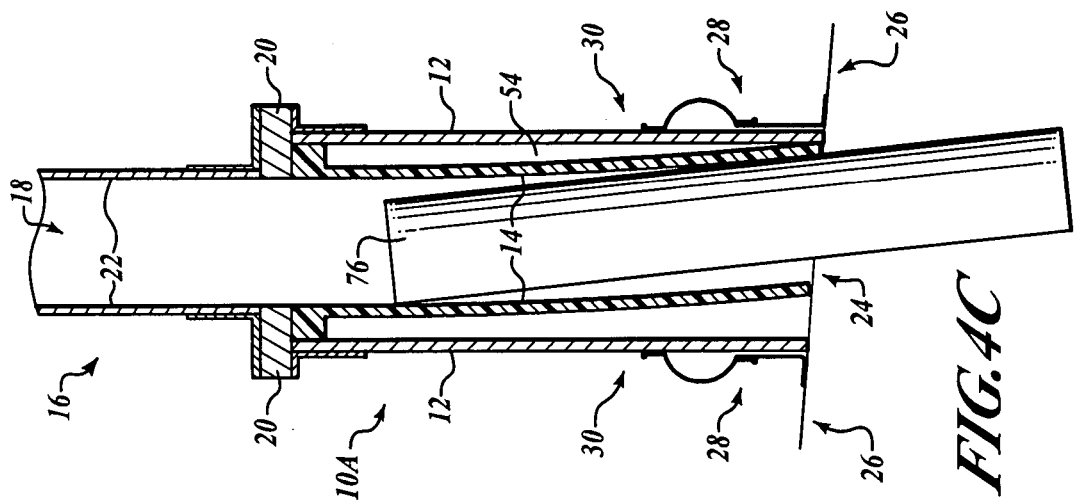
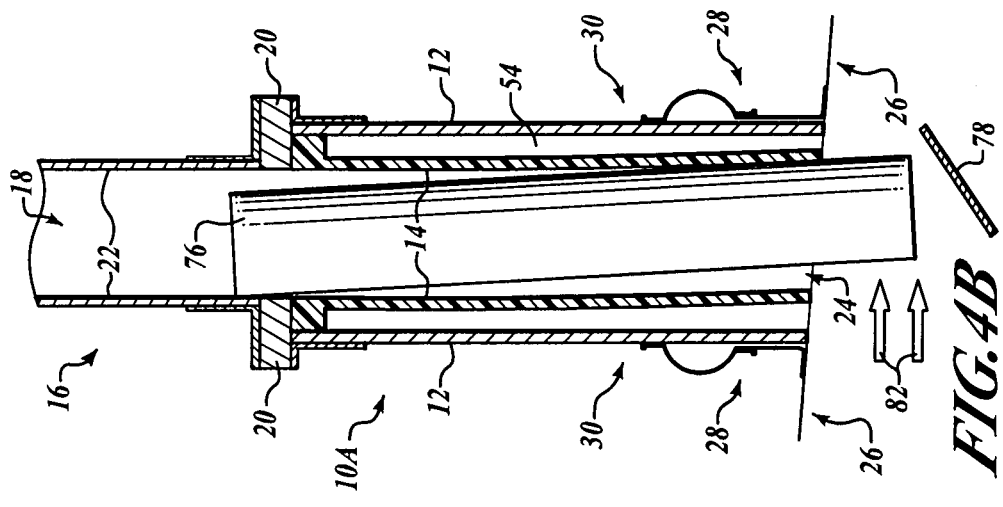
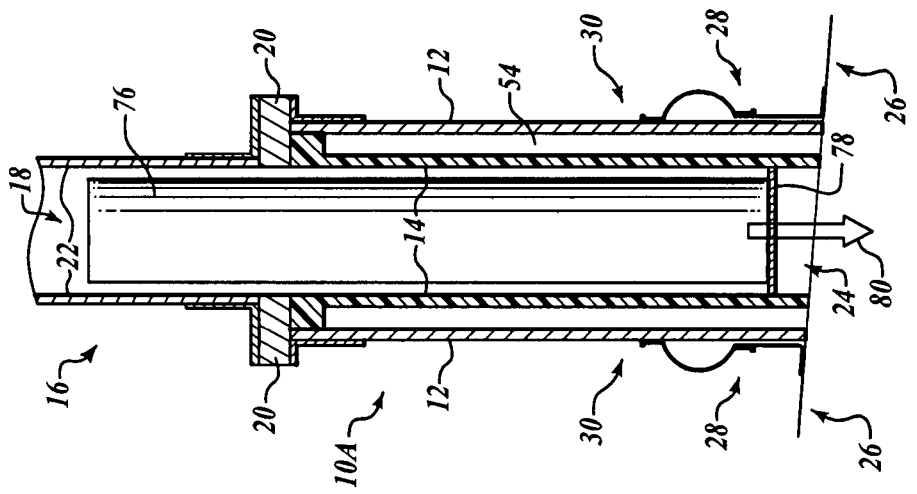

LOAD REDUCING STORES LAUNCH TUBE

GOVERNMENT RIGHTS

Embodiments were made with Government support under Agreement No. N00019-04-C-3146 awarded by the Naval Air Systems Command. The Government has certain rights therein.

BACKGROUND

Stores, such as sonobuoys and countermeasures, can be deployed from vehicles, such as aircraft, surface ships, and submarines, in a variety of manners. As an example, to minimize loads on a sonobuoy during deployment, some aircraft launch systems are oriented such that stores are ejected at an aft swept angle to reduce incident air loads. This practice, however, can cause interference with structural members and increase the weight of the launcher system. Therefore, launching at 90 degrees is desirable. As a further example in the case of sonobuoys, it is desirable to store a sonobuoy in its Sonobuoy Launch Container (SLC), thereby extending shelf life of the sonobuoy, and to eject the sonobuoy directly from the SLC.

The SLC is larger in diameter than the sonobuoy itself, and the sonobuoy rests on a bottom plate of the SLC. For store deployment from an SLC to occur, both the sonobuoy and the bottom plate must be ejected through a sonobuoy launch tube before departing an aircraft. The diameter of the sonobuoy launch tube must be large enough to accommodate the bottom plate (that has a diameter that is larger than the diameter of the sonobuoy). As a result, desirable load-reducing tolerances nominally close to diameter of the sonobuoy can not be maintained, and the sonobuoy can rotate within the sonobuoy launch tube during transit.

These rotations occur due to airloads that laterally push on the sonobuoy as it begins to emerge from the sonobuoy launch tube at the bottom of the aircraft. For example, an airstream force is roughly proportional to an exposed portion of the store. As the buoy rotates and clearances are taken up, contact with the launch tube will occur at the aft bottom edge of the launch tube and upper leading edge of the sonobuoy, causing local shear and moment loads. A friction force also occurs at these upper and lower bearing surfaces.

The airloads do not keep the buoy to one side, but can cause multiple impacts to occur as the sonobuoy bangs repeatedly into the sonobuoy launch tube during exit. These impacts can possibly result in shock loading outside of levels for which the sonobuoys are qualified.

Some attempts have been made to deal with problems associated with loading on sonobuoys during launch. For example, sonobuoys are launched from P-3C Orion maritime patrol aircraft at around a 55 degree angle from vertical to avoid buoy load problems. As discussed above, use of an angled launch system can cause interference with structural members and can increase weight of the launcher system. In other air vehicles, such as the Nimrod, sonobuoys are removed from their sonobuoy launch containers and are vertically launched from smaller-diameter launch tubes.

The foregoing examples of related art and limitations associated therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems and methods which are meant to be exemplary and illustrative, not limiting in scope. In various embodiments, one or more of the problems described above in the Background have been reduced or eliminated, while other embodiments are directed to other improvements.

In an exemplary embodiment, a stores launch tube includes an outer tube and an inner tube. The inner tube is disposed interior the outer tube and is configured to reduce load as a store exits therefrom. Thus, the exemplary stores launch tube can help reduce impact forces and bearing normal loads imparted to the store due to induced rotational impacts as the store emerges from the launch tube.

According to an aspect, tailored stiffness and/or damping properties can help to alleviate load. For example, the inner tube may be made of a flexible material, such as an acetal homopolymer, a polytetrafluroethylene, or a fluorocarbon.

According to another aspect, load reduction can also be achieved, if desired, by at least one load-reducing device, such as a spring or spring-like material such as foam, a piston, or a jet, which may be disposed between the inner tube and the outer tube. In such a case, a first load-reducing device may be disposed between an upper portion of the inner tube and the outer tube, and a second load-reducing device may be disposed between a lower portion of the inner tube and the outer tube at a radial position that is around 180 degrees from the first load-reducing device.

According to another aspect, if desired the inner tube may be provided as part of a unit, such as a canister, that can be easily replaced. For example, the inner tube may be received within a canister that has an outer casing that is attachable to the outer tube. Alternately, the inner tube may be attached directly to the outer tube.

According to another aspect, if desired the inner tube may be made of more than one piece, such as multiple segments with differing properties as desired, or as portions of a tube or tubes sliced longitudinally.

According to another aspect, if desired a filler material, such as foam, may be disposed between the inner tube and the outer tube. If provided, the filler material can help provide spring-like and energy dissipative qualities and/or can help reduce voids between the inner tube and the outer tube, depending on the mechanical properties of the filler material selected.

According to another aspect, the outer tube may have a substantially circular cross-section. Alternately, the outer tube may have a substantially oval cross-section or any cross-sectional shape as desired.

In another exemplary embodiment, a stores launch tube need not have a separate outer tube and inner tube. Instead, such an exemplary stores launch tube can include a tube member that is configured to reduce load as a store exits therefrom. A flexible seal is coupled to an exterior of the tube member and is arranged to cooperate with the tube member to act as a pressure barrier to an ambient environment. In such an exemplary embodiment, a separate outer tube and a separate inner tube are not needed, and their functions can instead be satisfied with a single tube member which can perform the functions related to impact and stress loading, hung store loading, and pressure differential loading.

In addition to the exemplary embodiments and aspects described above, further embodiments and aspects will become apparent by reference to the drawings and by study of the following detailed description.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

FIGS. 4A, 4B, and 4C illustrate operation of an exemplary stores launch tube;

DETAILED DESCRIPTION

Given by way of overview, in an exemplary embodiment, a stores launch tube includes an outer tube and an inner tube. The inner tube is disposed interior the outer tube and is configured to reduce load as a store exits therefrom. Thus, the exemplary stores launch tube can help reduce impact forces and bearing normal loads imparted to the store due to induced rotational moments as the store emerges from the launch tube. Details of exemplary embodiments and aspects thereof will be discussed below.

Figure 1A:
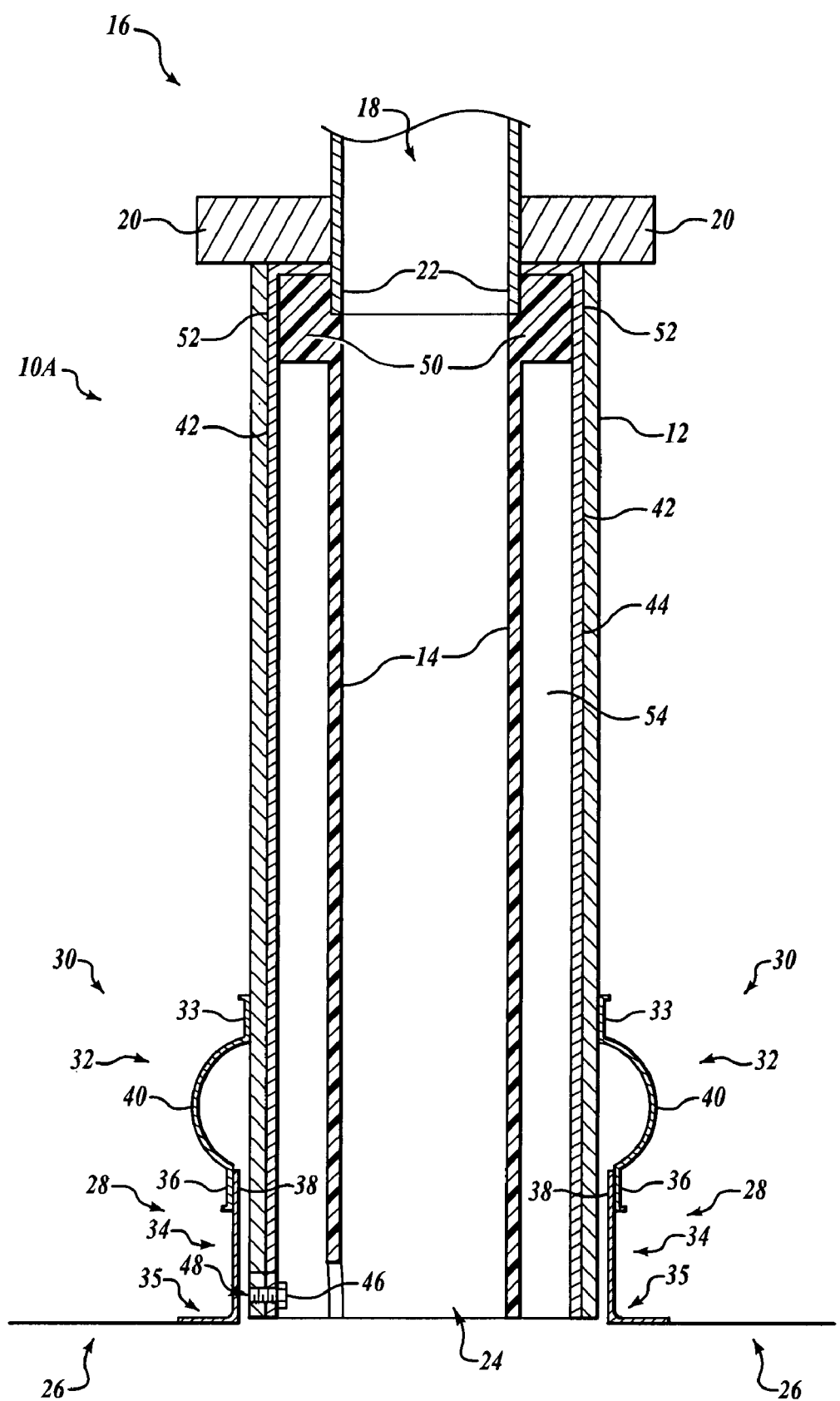
FIGS. 1A and 1B are cross-sectional side views of exemplary embodiments of stores launch tubes.

Referring now to FIG. 1A, a stores launch tube 10A includes an outer tube 12 and an inner tube 14. The inner tube 14 is disposed interior the outer tube 12 and is configured to reduce load as a store (not shown) exits therefrom.

The stores launch tube 10A is a lower portion of a stores launch tube assembly that also includes an upper tube portion 18 that is attached to a stores launcher (not shown) and a normally shut gate valve 20. The gate valve 20 is disposed toward a bottom end 22 of the upper tube portion 18. The gate valve 20 operates in conjunction with a stores launcher (not shown) and opens to permit the store (not shown) to be ejected from an opening 24 in an outer mold line 26 of a vehicle (not shown) by the stores launcher.

The outer tube 12 can serve multiple functions. For example, the outer tube 12 can serve to provide backup stiffness for hung store loads which are generally higher than normal launch loads, can provide for longitudinal deflections due to vehicle deflections, and can also provide a seal for pressure loads induced by opening and closing the gate valve 20 within the tube at various altitudes. The outer tube 12 is a pressure boundary between the interior of the stores launcher and ambient environment. As such, the outer tube 12 has a thickness and is made of a material as desired for a particular application. Material selection for the outer tube 12 may also depend in part on corrosion considerations (such that dissimilar metal galvanic corrosion is mitigated). For example, when the vehicle is an aircraft and the ambient environment is air, the outer tube 12 may be made of aluminum, steel, or the like. When the vehicle is a surface ship and the ambient environment is seawater, the outer tube 12 may be made of steel or the like. When the vehicle is a submarine and the ambient environment is seawater under high pressure, the outer tube 12 may be made of steel, high-strength steel such as HY-80, titanium, or the like.

The outer tube 12 includes a flexible pressure seal 28. The pressure seal 28 is located toward a lower portion 30 of the outer tube 12. The pressure seal 28 extends around the entire periphery of the exterior of the lower portion 30 of the outer tube 12. An exemplary, non-limiting example of the pressure seal 28 is described below. An upper portion 32 of the pressure seal 28 is attached, such as by welding, at an attachment portion 33 to the exterior of the lower portion 30 of the outer tube 12. A lower portion 34 of the pressure seal 28 is attached, such as by welding, at an attachment portion 35 to the outer mold line 26 exterior the opening 24.

An overlapping portion 36 of the upper portion 32 of the pressure seal 28 is urged against an overlapping portion 38 of the lower portion 34 of the pressure seal in sealing engagement, thereby maintaining a pressure seal and acting as a pressure barrier. The overlapping portion 36 is urged in sealing engagement against the overlapping portion 38 by a biasing portion 40 of the upper portion 32. The overlapping portions 36 and 38 are maintained in sealing engagement with each other but are able to slide along each other. This sliding, sealing engagement maintains a pressure barrier while accommodating relative motion between the outer tube 12 and the outer mold line 26. Such relative motion may arise due to pressure variations as the vehicle changes altitude in air or changes depth in water, or as the vehicle performs maneuvers that exert forces on the outer tube 12 or the outer mold line 26.

The inner tube 14 is disposed interior the outer tube 12 and is configured to reduce load as a store (not shown) exits therefrom. In an exemplary embodiment, the inner tube 14 is able to reduce load because the inner tube 14 is made of flexible material and can flex, which distributes load over more of the buoy surface, and also reduces shock to the buoy by lengthening the duration of the restoring impulse from collision with the wall of the launch tube. Given by way of non-limiting example, the flexible material used for the inner tube 14 may include such flexible materials as an acetal homopolymer like DELRIN™, available from DuPont; a polytetrafluroethylene (PTFE) like TEFLON™, available from DuPont, or HOSTAPLON™, or CUFLON™; or a fluorocarbon such as a tetrafluroethylene (TFE) fluorocarbon like any of several formulations of RULON™. Other flexible materials may be used as desired for a particular application, provided that the flexible material provides a coefficient of friction sufficiently low enough to permit a store (not shown) to travel without binding through the inner tube 14.

In an exemplary embodiment, the inner tube 14 may be provided as part of a unit, such as a canister 42, that can be easily replaced. For example, the inner tube may be received within the canister 42 that has an outer casing 44 that is attachable to the outer tube 12. The canister 42 may be made of any material as desired, such as for example aluminum, steel, or the like. In an exemplary embodiment, the casing 44 may be held in place by one or more fasteners 46 that are securely received (such as threadedly received) in an opening 48 (such as a threaded opening) in the outer tube 12. The opening 48 may be located near the outer mold line 26 in order to provide for ease of access when installing or removing the canister 42.

The inner tube 14 is attached at an attachment portion 50 to an interior of the canister 42 at an upper portion 52 of the canister 42. In an exemplary embodiment, the attachment portion 50 is bonded to the upper portion 52 of the canister 42 with an adhesive that is appropriate for a desired application. Suitable types of adhesives depend on the type of flexible launch tube material chosen.

Flexing of the inner tube 14 is accommodated by an interstitial chamber 54 between the inner tube 14 and the casing 44. The interstitial chamber provides a space through which the inner tube 14 can flex unimpeded as the store (not shown) emerges from the opening 24 and rotates due to forces exerted on the store by slipstream forces.

Figure 1B:
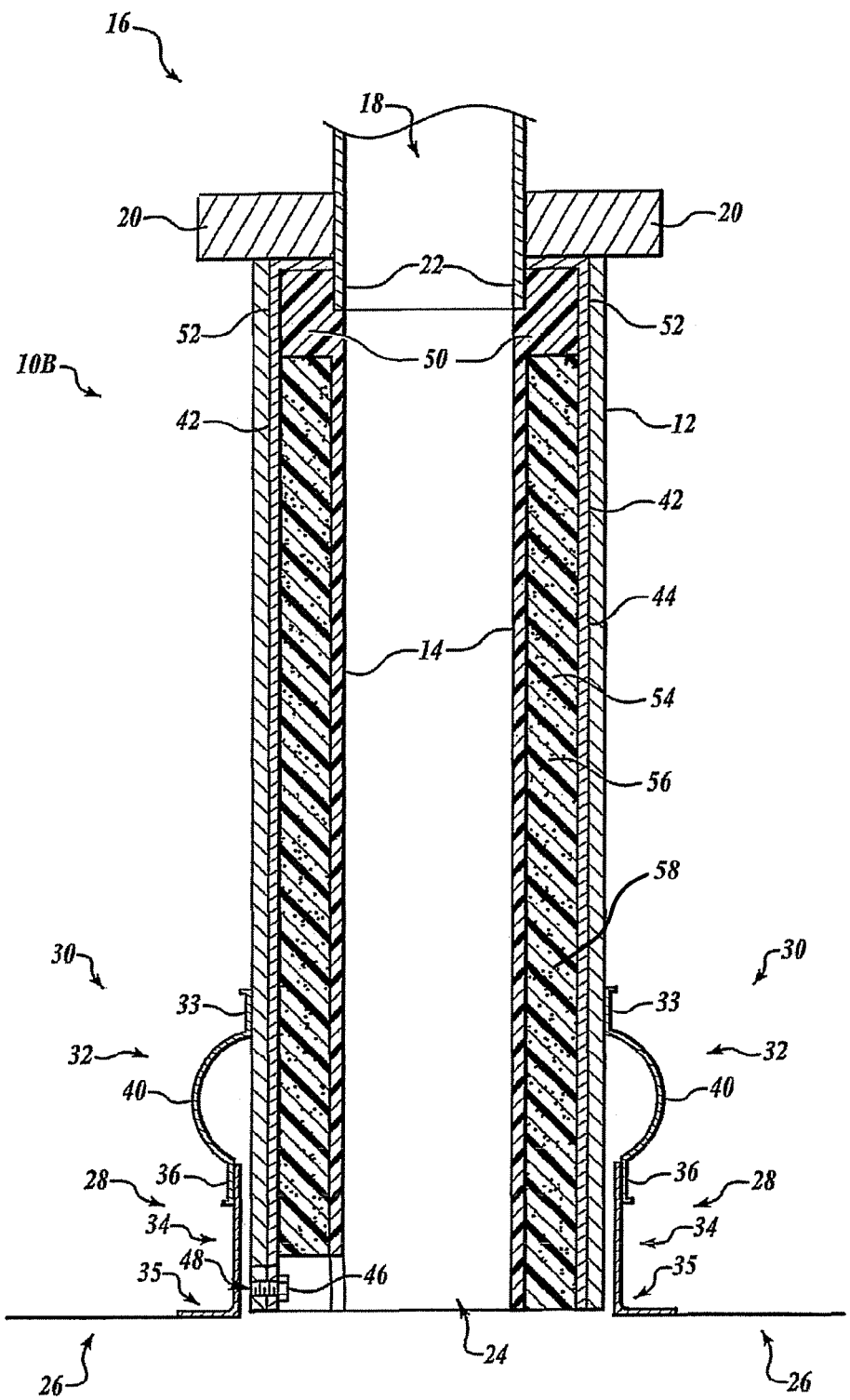

Referring now to FIG. 1B, an exemplary stores launch tube 10B includes all of the features of the stores launch 10A (FIG. 1A), but the interstitial chamber 54 optionally is at least partially filled with a soft filler material 56, such as foam. If provided, the filler material 56 can help provide spring-like and energy dissipative qualities and/or can help reduce voids between the inner tube 14 and the outer tube 12, depending on the mechanical properties of the filler material 56 selected. Filling the interstitial chamber 54 with the filler material 56 can enhance the function of the inner tube 14, or not affect it at all, as desired. For example, certain types of filler material 56, such as foam, can provide more stiffness and/or dampening to the inner tube 14, if desired. Alternatively, other types of filler material 56 can be selected which do not affect stiffness or dampening of the inner tube 14, but which do fill the interstitial chamber 54 at least partially so foreign objects—which could substantially affect flexing capability of the inner tube 14—do not enter the interstitial chamber 54. To that end, the interstitial chamber 54 need not be completely filled with the filler material 56, if provided. The interstitial chamber 54 may be sealed sufficiently with the filler material 54 being provided just in a lower portion 58 of the interstitial chamber 54. Alternatively, other means such a flexible membrane may be used to afford a seal between the inner tube 14 and the outer tube 12, or between the inner tube 14 and the outer casing 44. Like reference numbers are used to denote features of the stores launch tube 10B in common with the stores launch tube 10A (FIG. 1A), and their details need not be repeated for an understanding of the embodiment.

Figure 2A:
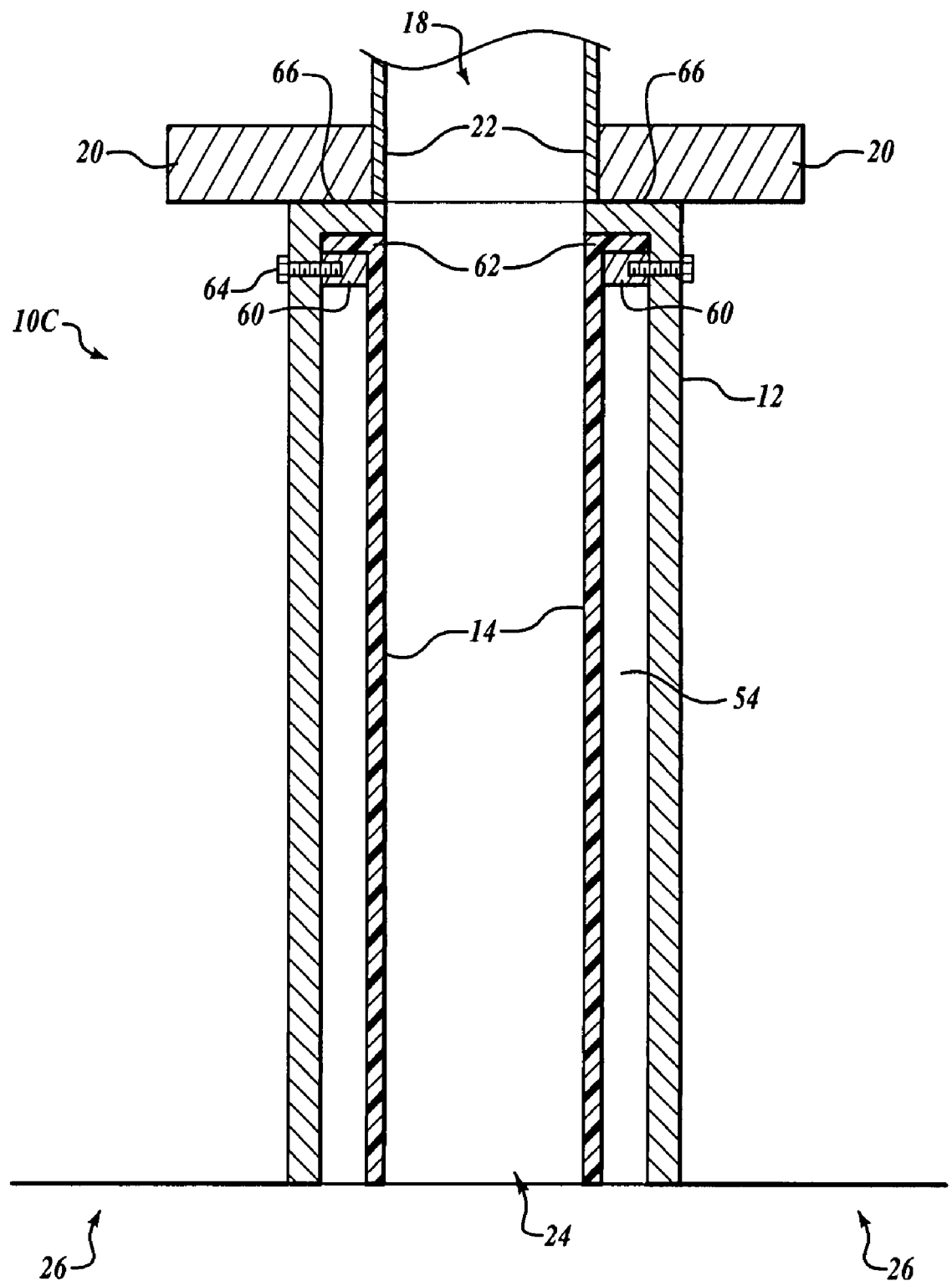
FIGS. 2A, 2B, and 2D are cross-sectional views of further exemplary embodiments of stores launch tubes.

Referring now to FIG. 2A, a stores launch tube 10C includes an outer tube 12 and an inner tube 14. The inner tube 14 is disposed interior the outer tube 12 and is configured to reduce load as a store (not shown) exits therefrom. The stores launch tube 10C includes many features in common with the stores launch tube 10A (FIG. 1A) that are indicated by like reference numbers, and their details need not be repeated for an understanding of the embodiment. Unlike the stores launch tube 10A (FIG. 1A), in the stores launch tube 10C the inner tube 14 retained within the outer tube 12 without use of a unit such as the canister 42 (FIG. 1A). For example, an indexed retention ring 60 may be disposed within the inner tube 14 under an upper flange 62 of the inner tube 14. The indexed retention ring 60 is fastened against the outer tube 12 with fasteners 64. Fastening the indexed retention ring 60 against the outer tube 12 holds the upper flange 62 of the inner tube 14 securely against an upper flange 66 of the outer tube 12.

Figure 2B:
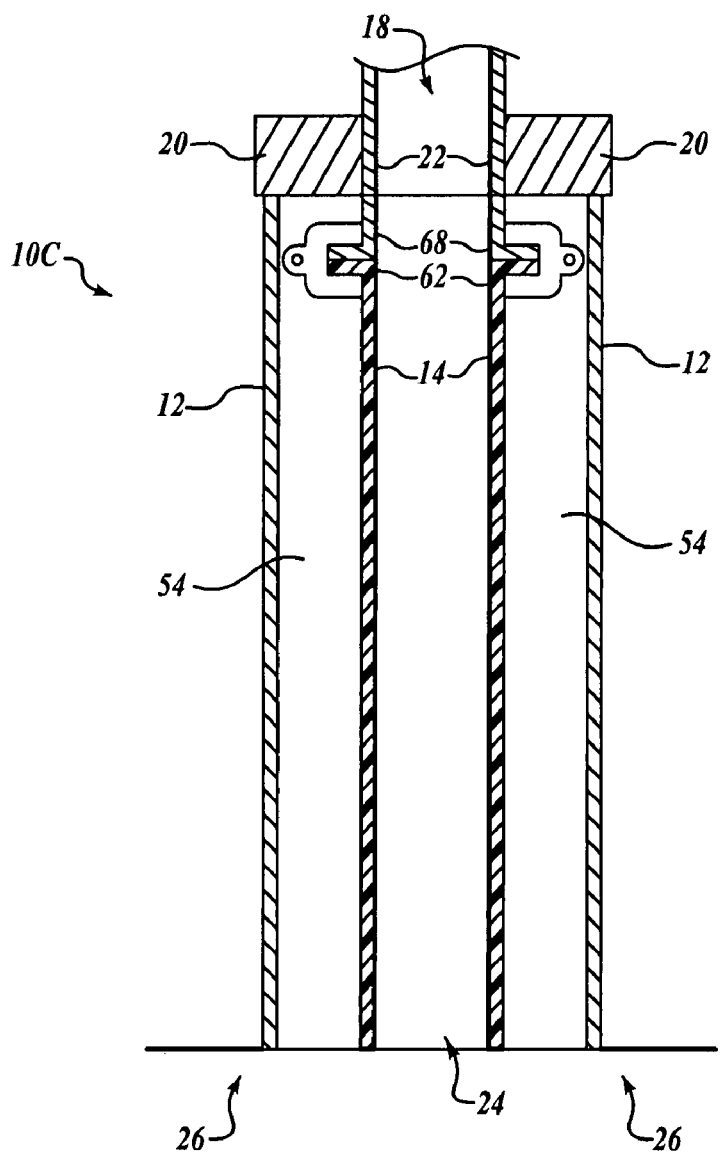
Figure 2C:
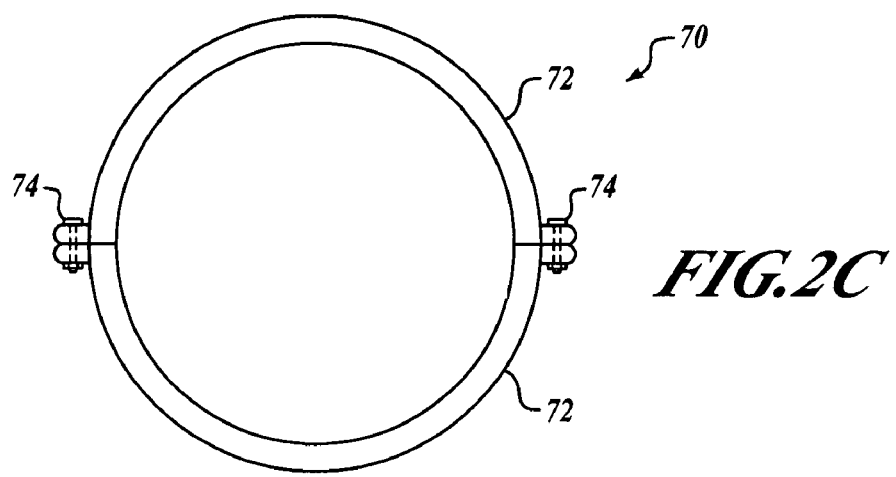
FIG. 2C is a top view of a portion of the stores launch tube of FIG. 2B.

Referring now to FIGS. 2B and 2C, the upper flange 62 of the inner tube 14 instead may be held securely against a lower flange 68 of the lower portion 22 of the upper tube portion 18 by a bracket 70. The bracket 70 may include two bracket members 72 that each extend around half of the periphery of the exteriors of the flanges 62 and 68. The bracket members are held together securely by fasteners 74.

Figure 2D:
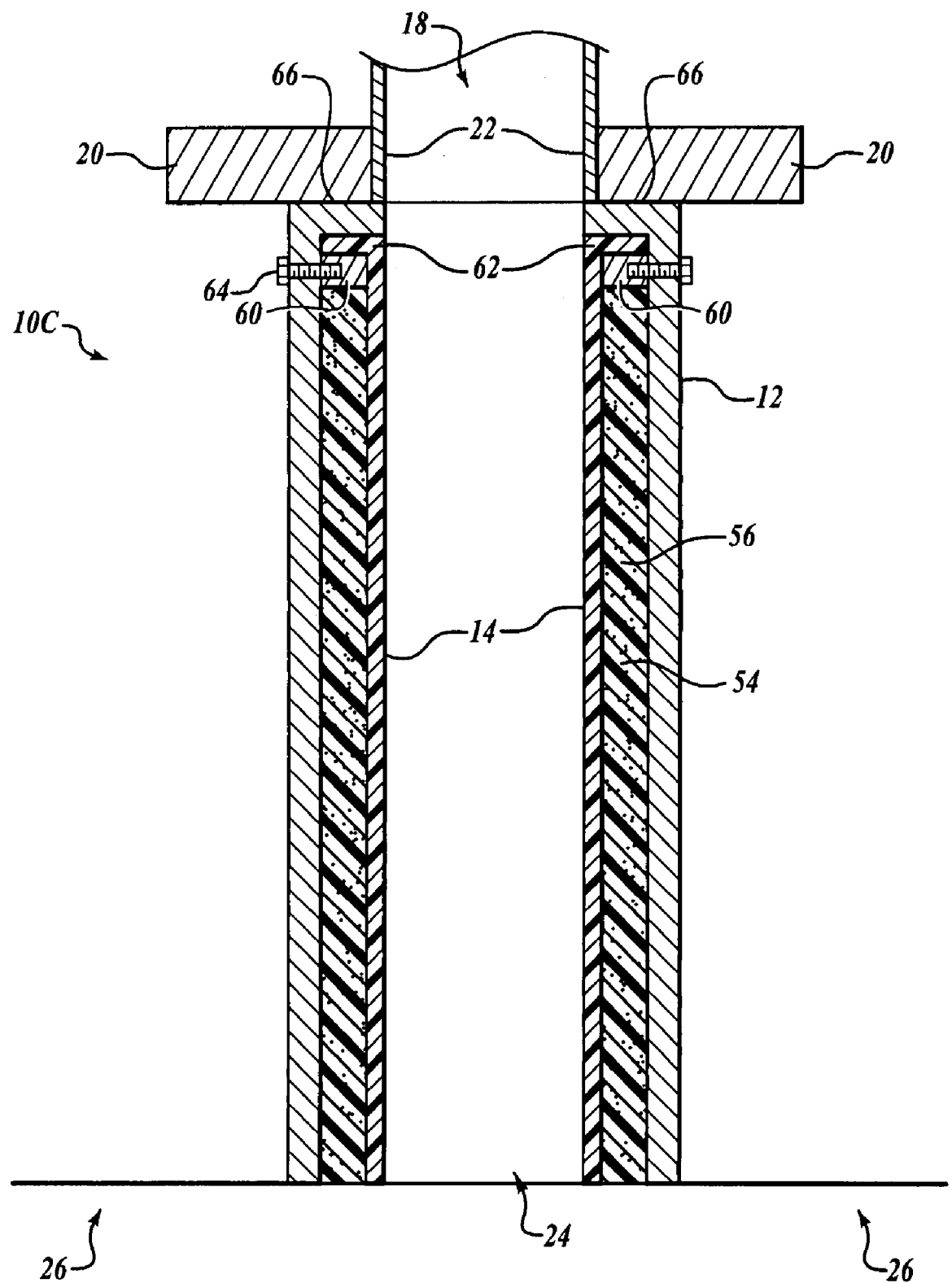

Referring now to FIG. 2D, an exemplary stores launch tube 10D includes all of the features of the stores launch 10C (FIG. 2A), but the interstitial chamber 54 optionally is at least partially filled with the soft filler material 56, as described above. As discussed above, the interstitial chamber 54 need not be completely filled with the filler material 56, if provided. The interstitial chamber 54 may be sealed sufficiently with the filler material 54 being provided just in a lower portion 58 of the interstitial chamber 54. Like reference numbers are used to denote features of the stores launch tube 10D in common with the stores launch tube 10C (FIG. 2A), and their details need not be repeated for an understanding of the embodiment.

Referring now to FIGS. 3A through 3F, various embodiments of stores launch tubes may have various cross-sections, as desired for a particular application. While the outer tube 12 has been illustrated in the drawings, by way of non-limiting examples, as having either a circular cross-section or an oval cross-section, it is not intended that the outer tube 12 be limited to circular or oval cross-sections. No limitation whatsoever is intended regarding the cross-section of the outer tube 12. Thus, the outer tube 12 can have any cross-section shape as desired that is consistent with the outer tube 12 performing its functions, such as providing backup stiffness for hung store loads which are generally higher than normal launch loads, or providing for longitudinal deflections due to vehicle deflections, or for providing a seal for pressure loads induced by opening and closing the gate valve 20 within the tube at various altitudes. With this context in mind and referring now to FIG. 3A, the outer tube 12 and the inner tube 14 of the stores launch tube 10A each suitably have a substantially circular cross section and each are made of one-piece construction.

Figure 3A:
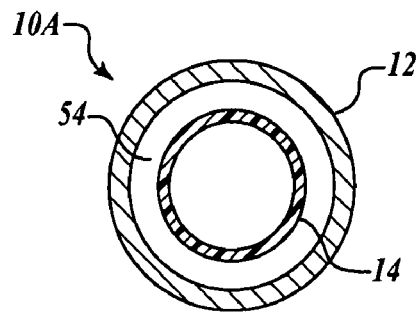
FIGS. 3A, 3B, 3C, 3D, 3E, 3F, 3G, and 3H are cross sectional top views of the exemplary stores launch tubes of FIGS. 1A, 1B, 2A, 2B, and 2D.
Figure 3B:
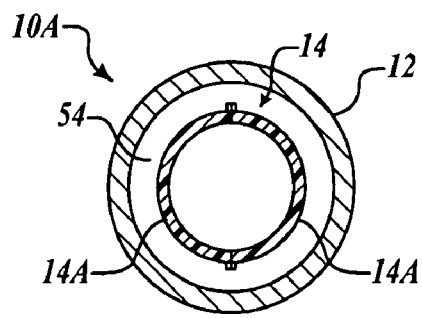

Referring now to FIG. 3B, the outer tube 12 and the inner tube 14 of the stores launch tube 10A each suitably have a substantially circular cross section. The outer tube 12 is made of one-piece construction, If desired, the inner tube may be made of more than one piece. To that end, the inner tube 14 can be made of sections 14A. Given by way of non-limiting example, the sections 14A may be multiple segments with differing properties, as desired, or portions of a tube or tubes sliced longitudinally. While two of the sections 14A are illustrated by way of non-limiting example, the number of the sections 14A is not intended to be limited whatsoever. Any number of the sections 14A may be used as desired to make up the inner tube 14.

Figure 3C:
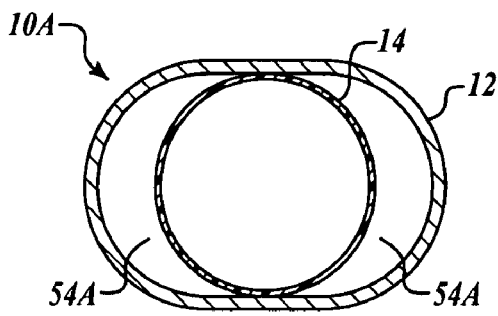

Referring now to FIG. 3C, the outer tube 12 and the inner tube 14 of the stores launch tube 10A each suitably are made of one-piece construction. The inner tube 14 has a substantially circular cross section. If desired, the outer tube 12 have a substantially oval cross section. In this case, the exterior of the inner tube 14 abuts the interior of the outer tube 12. This arrangement creates two substantially crescent-shaped interstitial chambers 54A. Thus, a more slender (albeit slightly elongated) cross section than that illustrated in FIG. 3A can be obtained. Use of a substantially oval cross section for the outer tube 12 may be desired in the event of interference with structural members or other nearby systems or susbsystems, or to achieve stiffness and or dampening effects limited by and/or tailored to the direction of load reduction only.

Figure 3D:
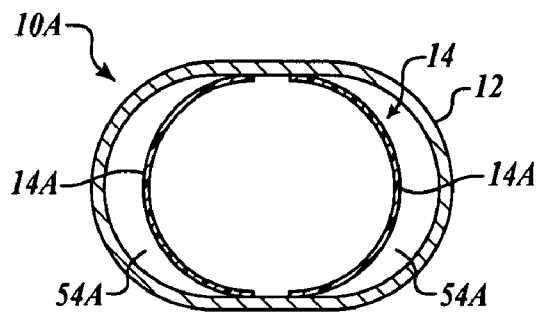
Figure 3E:
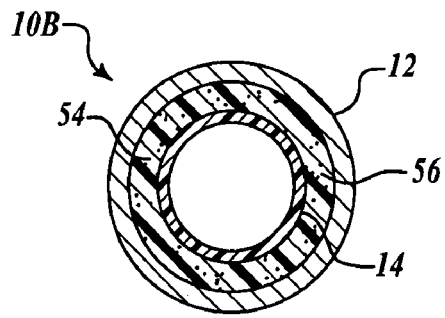
Figure 3F:
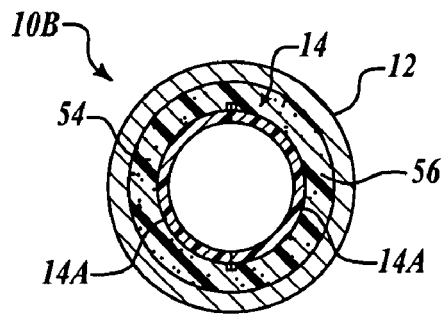
Figure 3G:
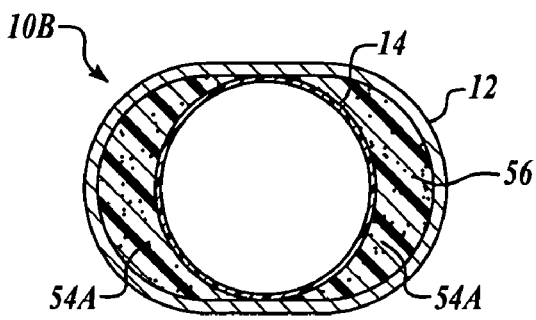
Figure 3H:
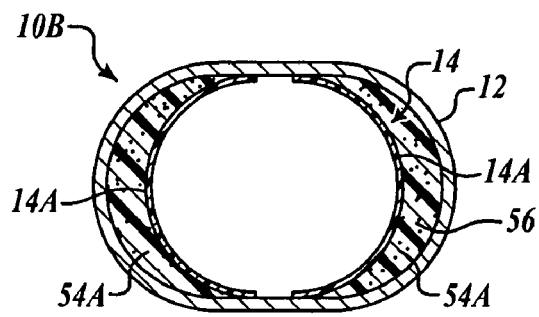

Referring now to FIG. 3D, the outer tube 12 suitably is made of one-piece construction and has a substantially oval cross section (as illustrated in FIG. 3C). The inner tube 14 has a substantially circular cross section but is made of the sections 14A. While two of the sections 14A are illustrated by way of non-limiting example, the number of the sections 14A is not intended to be limited whatsoever. Any number of the sections 14A may be used as desired to make up the inner tube 14.

Referring now to FIG. 3E, 3F, 3G, and 3H, the cross sections of the outer tube 12 and the inner tube 14 are the same as those illustrated in FIGS. 3A, 3B, 3C, and 3D, respectively. However, the interstitial chambers 54 or 54A, as appropriate, are at least partially filled with the filler material 56, as described above.

Referring now to FIGS. 4A, 4B, and 4C, embodiments operate as follows. As shown in FIG. 4A, the gate valve 20 has been opened, and a store 76, such as a countermeasure or a sonobuoy resting on a bottom plate 78 of its sonobuoy launch container (not shown), descends through the upper tube portion 18 and the stores launch tube 10A, as shown by an arrow 80.

As shown in FIG. 4B, the store 76 begins to emerge from the stores launch tube 10A through the opening 24 at the outer mold line 26. The bottom plate 78 (in the case of a sonobuoy that is launched from its sonobuoy launch container) falls away from store 76. Slipstream forces, indicated by arrows 82, cause the store 76 to begin to rotate (in a fore-aft manner) within the stores launch tube 10A. When the store 76 has rotated sufficiently, it first contacts a lower, aft portion of the inner tube 14, thereby resulting in a bearing stress on the store 76. Because the inner tube 14 is made of flexible material, as described above, the inner tube 14 flexes rearwardly at lower portions of the inner tube 14 responsive to the fore-aft rotation of the store 76. In this manner, rearward flexing of the lower portions of the inner tube 14 can help reduce bearing stress on the store 76.

As shown in FIG. 4C, the store 76 continues to rotate in a fore-aft manner and the store 76 contacts an upper, forward portion of the inner tube 14, thereby resulting in impact shock loads on the store 76. Because the inner tube 14 is made of flexible material, as described above, the inner tube 14 can help reduce the impact shock loads. In addition, the inner tube 14 may flex forwardly at portions of the inner tube 14 near the area of impact with the store 76 responsive to the fore-aft rotation of the store 76. In this manner, forward flexing of portions of the inner tube 14 can help reduce impact shock loads on the store 76.

Figure 5A:
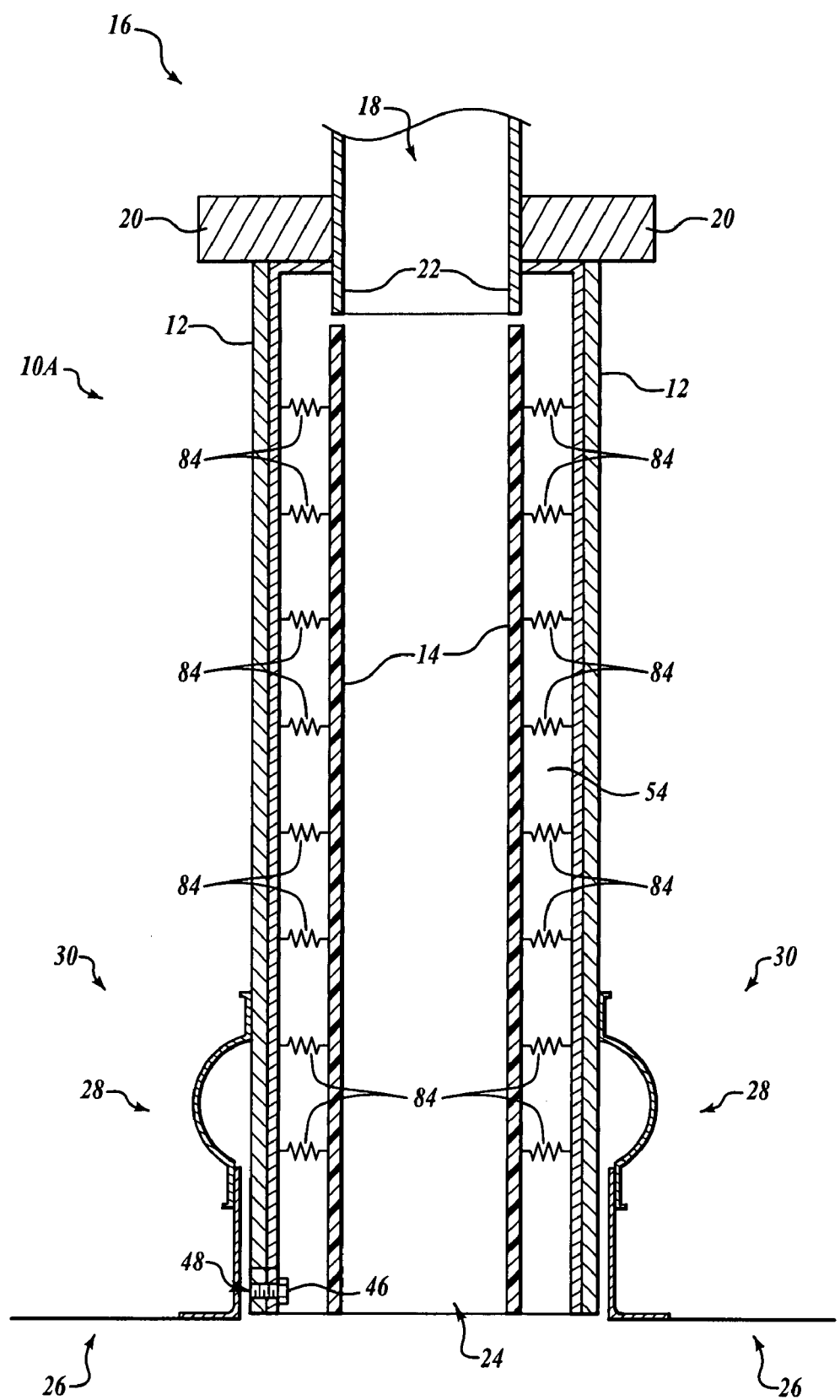
FIGS. 5A, 5B, 5C, and 5D illustrate exemplary load-reducing features.
Figure 5B:
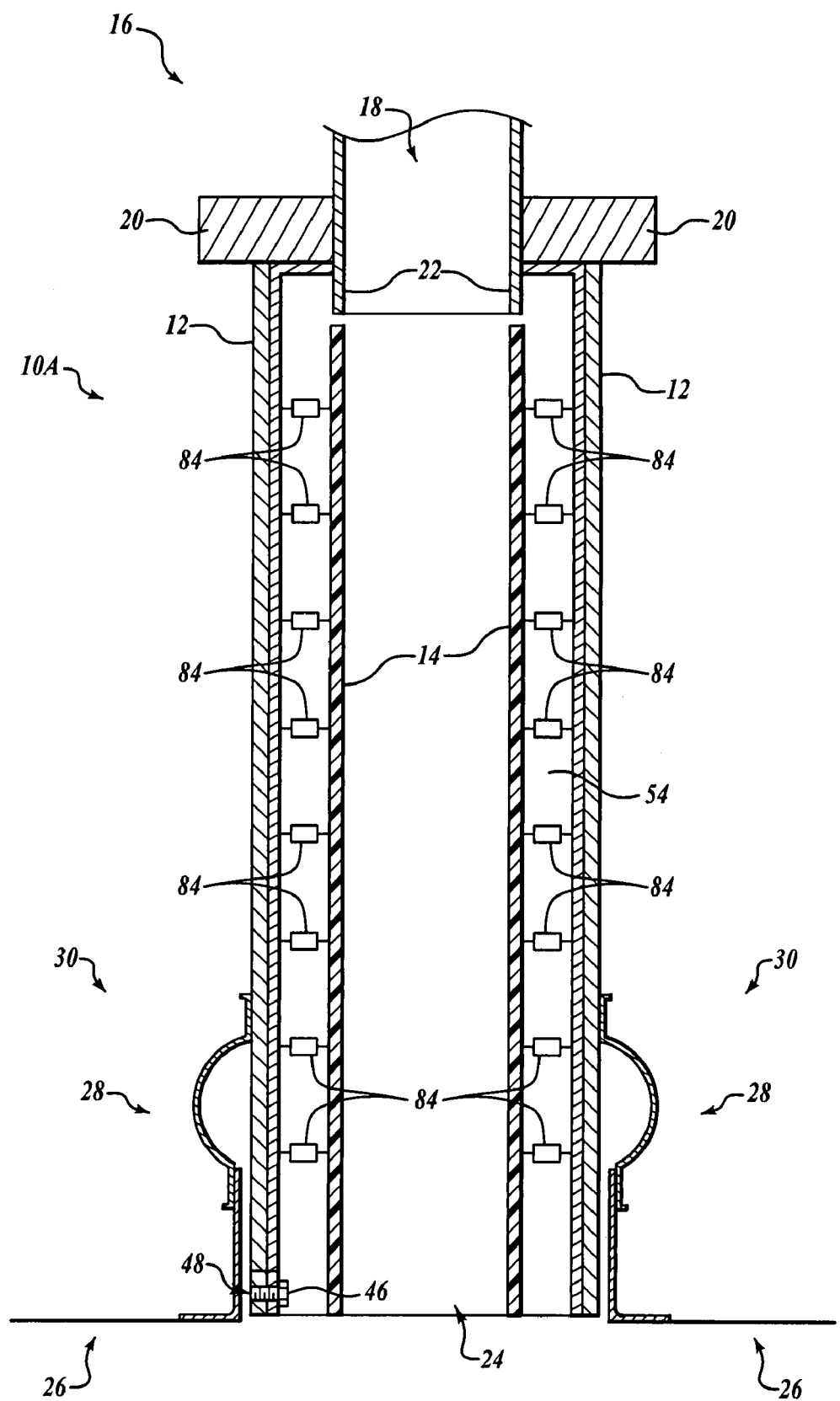
Figure 5C:
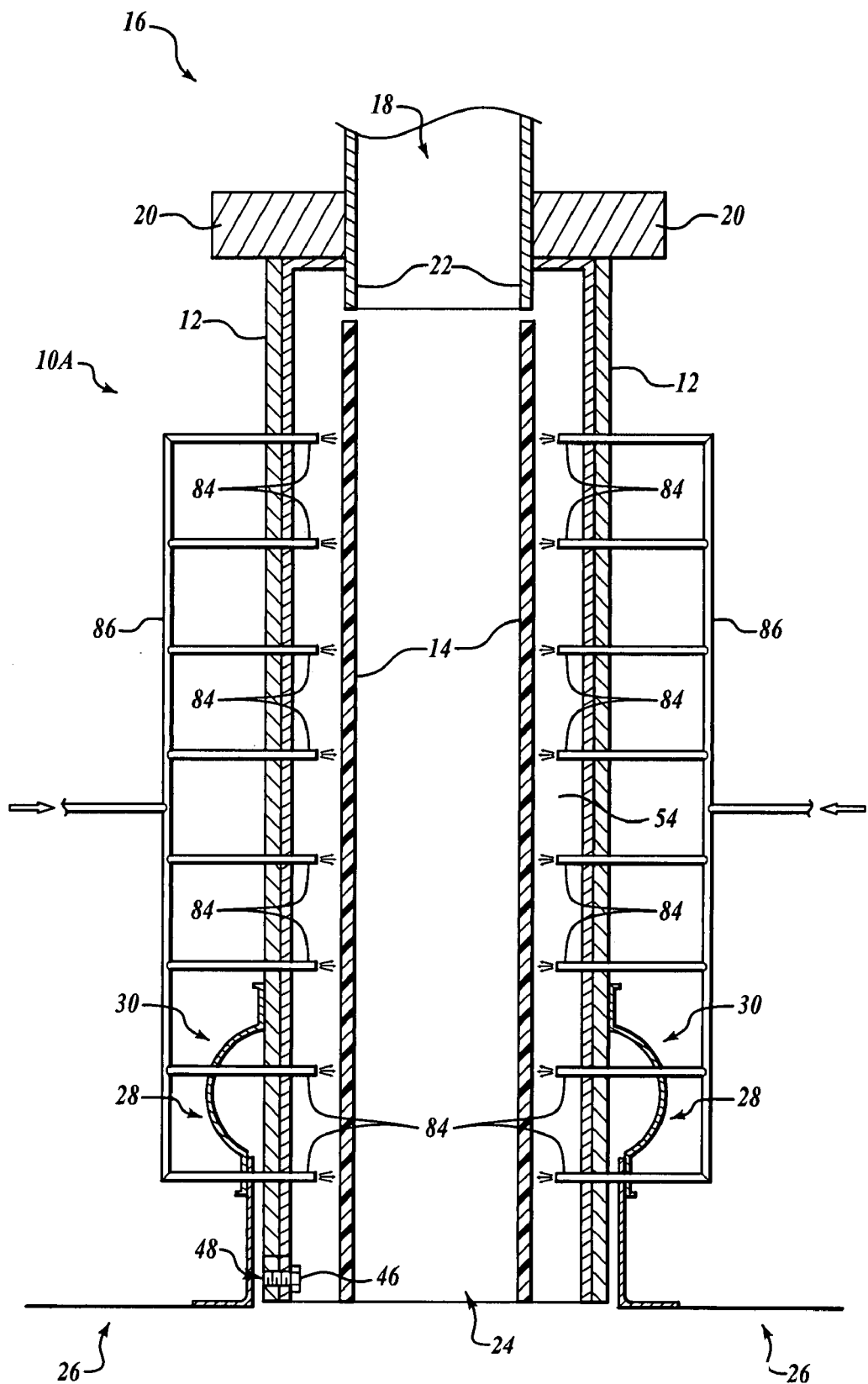

Referring now to FIGS. 5A, 5B, and 5C, at least one load-reducing device 84, such as a spring, a piston, or a jet, may be disposed between the inner tube 14 and the outer tube 12. The inner tube 14 should not be rigidly attached, but instead should be permitted to move freely, restrained only by the load reducing device 84. A load-reducing device 84 may be disposed between an upper, forward portion of the inner tube 14 and the outer tube 12 to reduce impact shock loads on the store (not shown), and another load-reducing device 84 may be disposed between a lower, rearward portion of the inner tube 14 and the outer tube 12 (that is, at a radial position that is around 180 degrees from the load-reducing device at the upper, forward portion of the inner tube 14). However, as many of the load-reducing devices 84 may be provided as desired for a particular application.

Figure 5D:
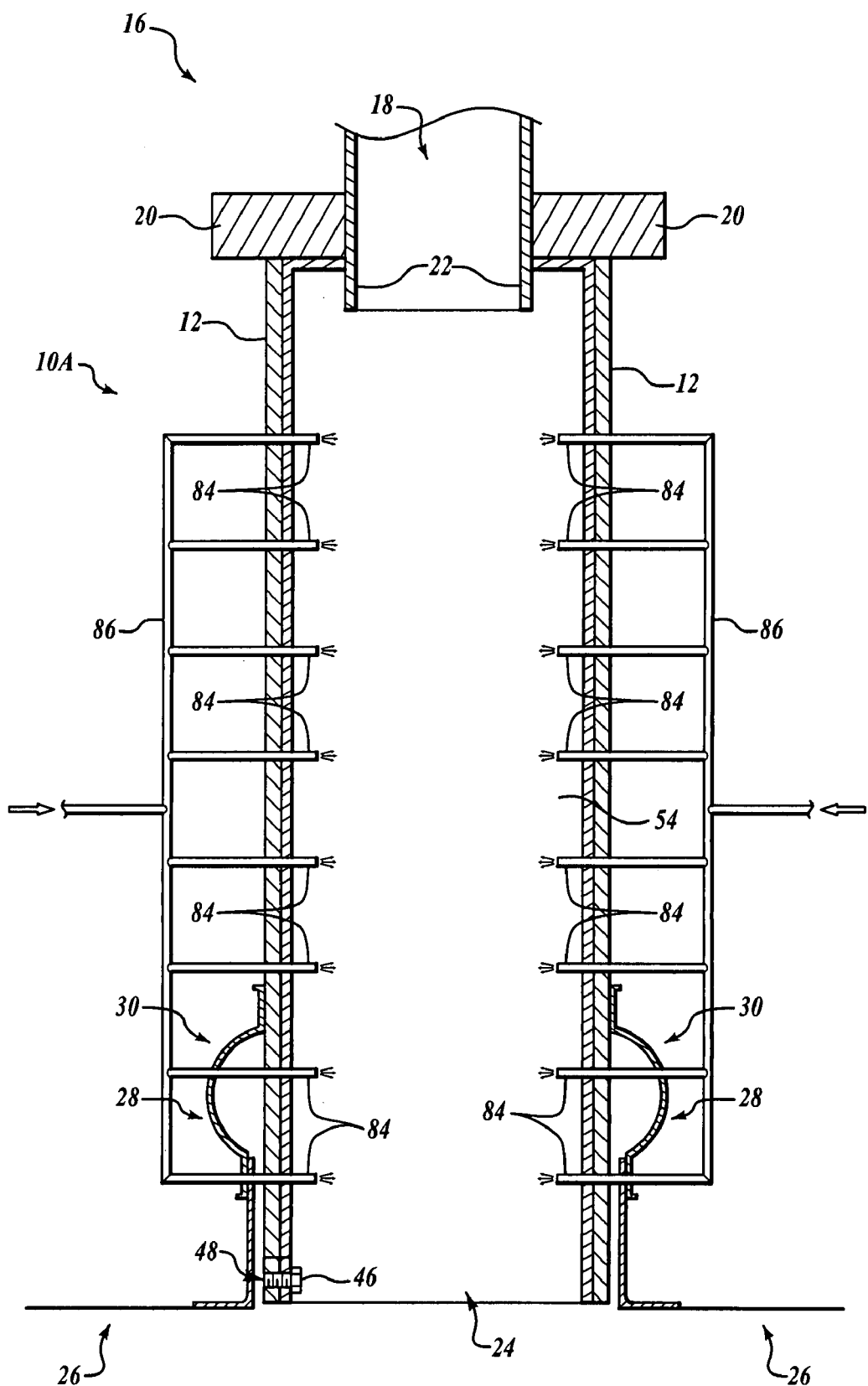

Any type of load-reducing device may be used as desired for a particular application. Given by way of non-limiting example and without any intention of limitation, the load-reducing devices 84 may be provided in the form of springs (FIG. 5A), a spring-like material such as foam (not shown), pistons (FIG. 5B), fluid jets (FIG. 5C), or the like. As shown in FIG. 5C, a source of fluid (not shown) provides the fluid to a manifold 86. Jets 84 receive the fluid from the fluid from the manifolds 86. The fluid may be selected as desired for a particular application. For example, a gas such as air or an inert gas may be used as the fluid when the vehicle is an aircraft or a surface ship or a submarine. A gaseous fluid as described above or a liquid such as water or seawater may be used as the fluid when the vehicle is a surface ship or a submarine. Use of water or seawater as the fluid would provide for quieter operation for a submarine than use of a gaseous fluid (because gas bubbles would eventually collapse due to sea pressure, thereby causing cavitation-like noise). As shown in FIG. 5D, in another embodiment that includes the jets 84 no inner tube is necessary. In this embodiment, the outer tube 12 provides the pressure boundary and the jets 84 perform load-reduction functions of an inner tube.

The load-reducing devices 84 can reduce bearing stress and impact shock loads in addition to load reduction provided by the inner tube 14 when the inner tube 14 is made of a flexible material. If desired, the load-reducing devices 84 can reduce bearing stress and impact shock loads in lieu of load reduction provided by the inner tube 14 when the inner tube 14 is not made of a flexible material. In such a case, the inner tube 14 can be made of any material as desired for a particular application, such as aluminum, steel, titanium, or the like.

While the load-reducing devices 84 are illustrated in use with the stores launch tube 10A, the load-reducing devices 84 can be used with any embodiment as desired. For example, the load reducing devices can be used with the stores launch tube 10B (FIG. 1B) and the stores launch tube 10D (FIG. 2D) when the filler material 56 (FIGS. 1B and 2D) does not interfere with the load-reducing devices 84—such as when the filler material 56 serves only to seal the bottom of the interstitial chamber 54 (FIGS. 1B and 2D). Alternatively, the filler material 56 can serve as an enhancement to the stores launch tube 10A by providing tailored stiffness and/or dampening.

Figure 6:
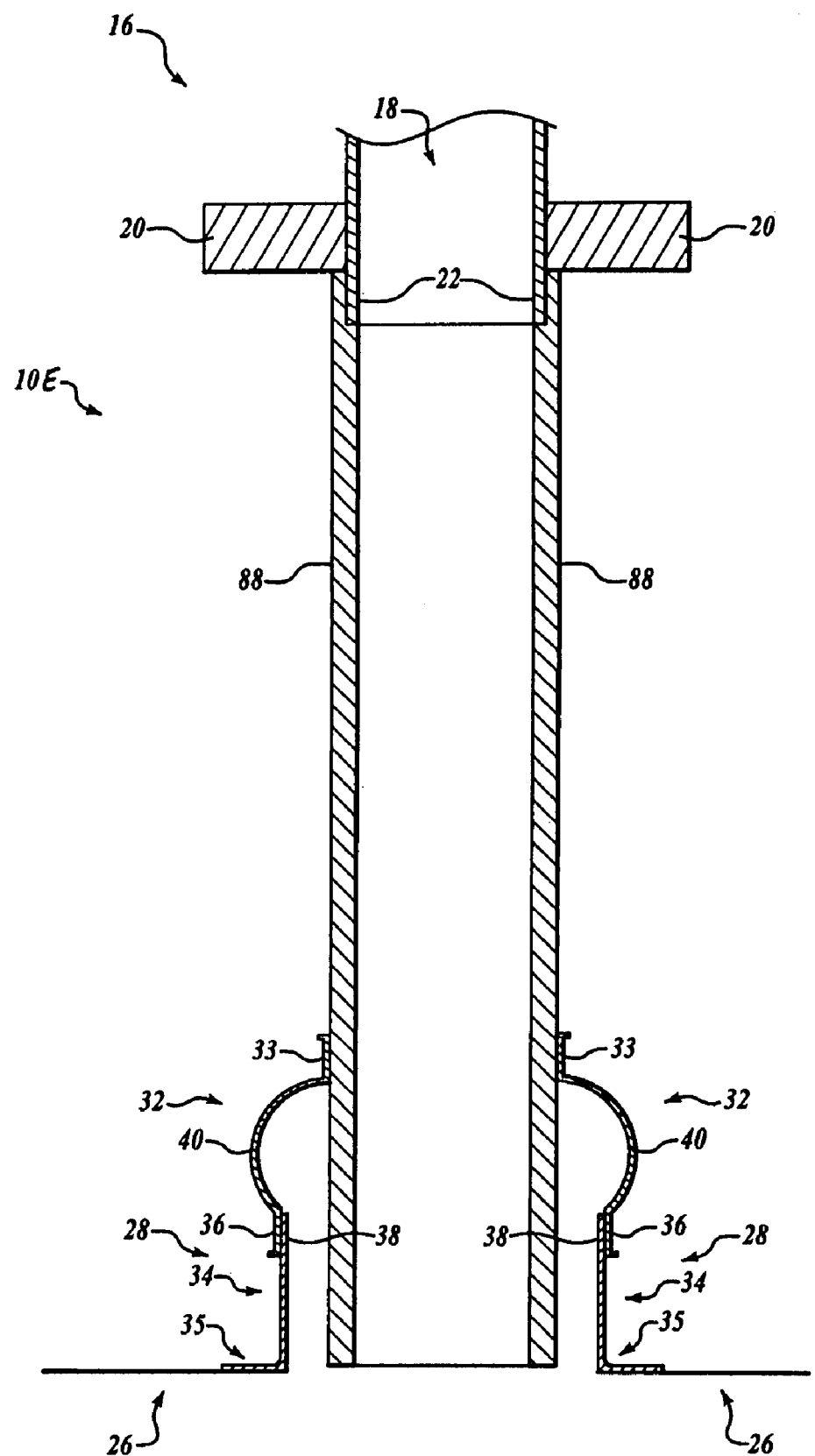
FIG. 6 is a cross-sectional side view of another exemplary stores launch tube.

Referring now to FIG. 6, a stores launch tube 10E includes a tube member 88 that is configured to reduce load as a store (not shown) exits therefrom. The stores launch tube 10E includes many features in common with the stores launch tube 10A (FIG. 1A) that are indicated by like reference numbers, and their details need not be repeated for an understanding of the embodiment. Unlike the stores launch tube 10A (FIG. 1A), in the stores launch tube 10E only the tube member 88 is provided. That is, the stores launch tube 10E need not have a separate outer tube and inner tube. Instead, the stores launch tube 10E includes a tube member 88 that is configured to reduce load as a store exits therefrom. The flexible seal 28 is coupled to an exterior of the tube member 88 and is arranged to cooperate with the tube member 88 to act as a pressure barrier to an ambient environment. In such an exemplary embodiment, a separate outer tube and a separate inner tube are not needed, and their functions can instead be satisfied with the single tube member 88 which can perform the functions related to impact and stress loading, hung store loading, and pressure differential loading. To that end, the tube member 88 is configured to flex as a store (not shown) exits therefrom, as described above for the inner tube 14 (FIG. 1A), while also meeting any or all other functions previously assigned to the outer tube 12 (FIG. 1A), such as acting as a pressure barrier, permitting axial movement, and providing adequate stiffness for hung store loads. For example, the stores launch tube 10E could provide both soft (load relieving) and hard (hung store) stiffness attributes if a material with nonlinear stiffness characteristics is used for the tube member 88, or through geometric considerations in tube construction. For example, bilinear stiffness could be achieved with a soft material encased by a stiff material with a gap between them. It will be appreciated that any of the functions performed by an outer tube can alternatively be performed by a single tube with no loss of functionality. In such a case, manufacturing costs and/or ease of production may help determine which approach is more desirable in a given application.

Figure 7A:
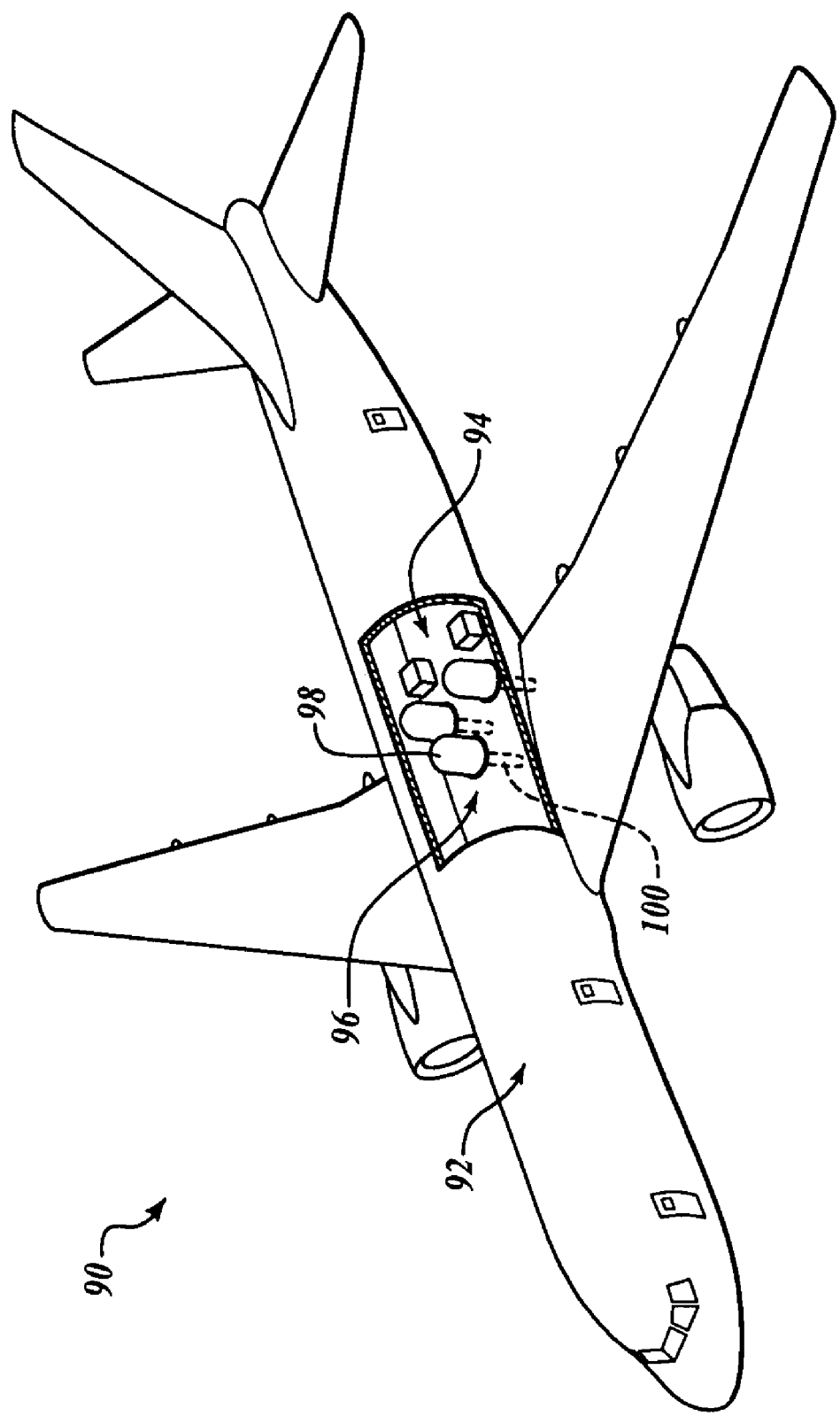
FIGS. 7A, 7B, and 7C illustrate vehicles that include an exemplary stores launch tube.
Figure 7B:
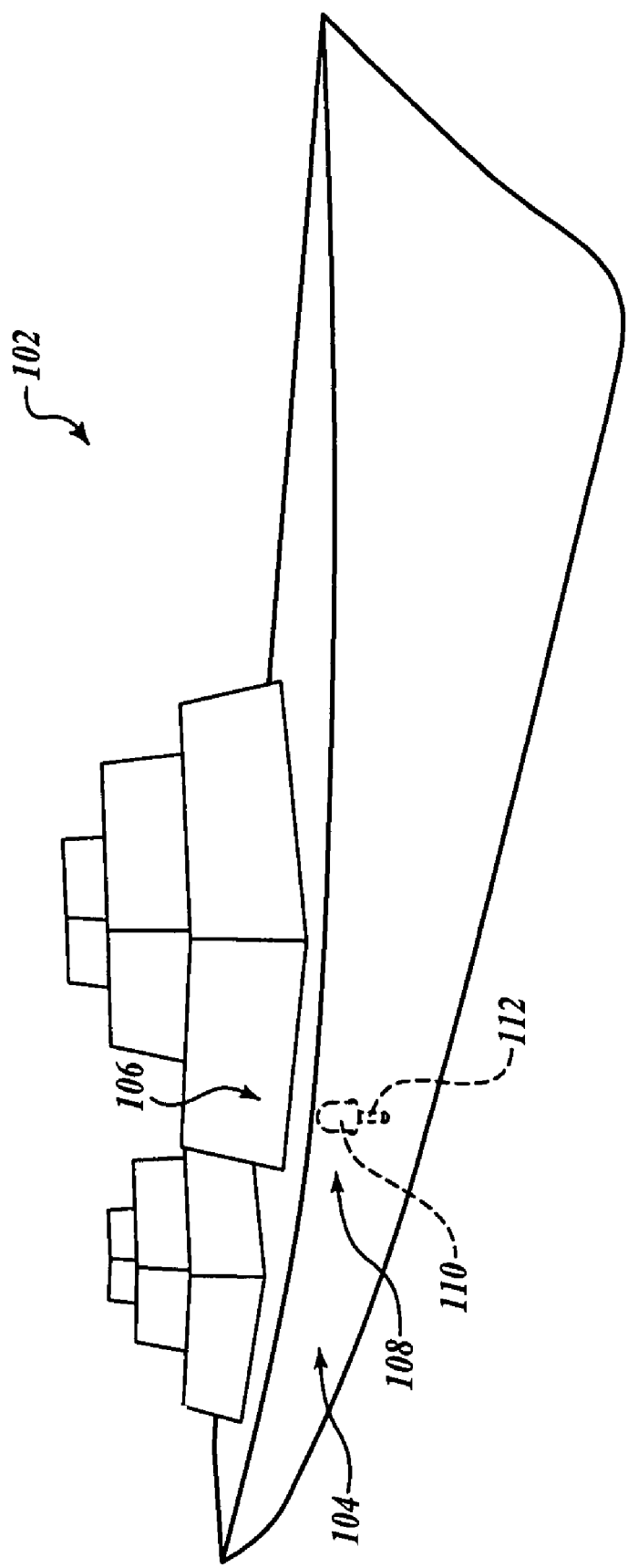
Figure 7C:
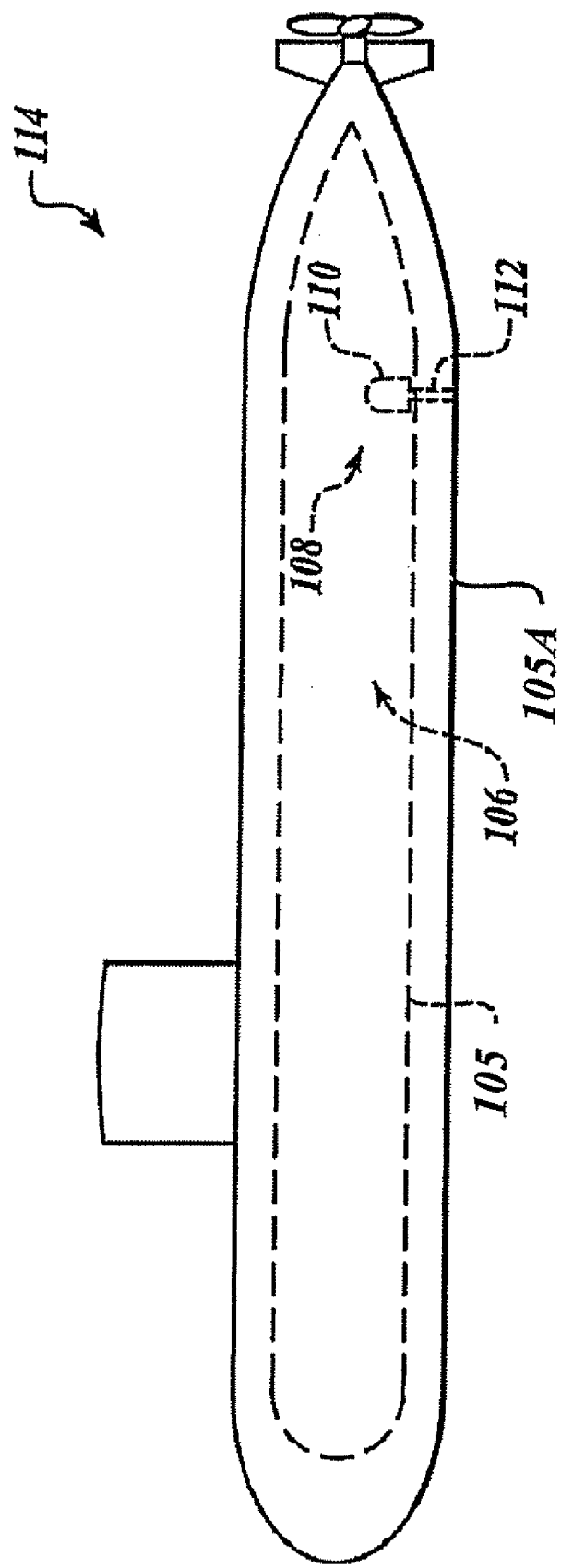

Referring now to FIGS. 7A, 7B, and 7C, any of the stores launch tubes described herein may be used in vehicles such as an aircraft, a surface ship, or a submarine. While not being intended to be limiting, the stores launch tube suitably is oriented substantially perpendicular to a fore-aft axis of the vehicle. However, it will be appreciated that in other embodiments the stores launch tube suitably is not oriented substantially perpendicular to a fore-aft axis of the vehicle and can be oriented as desired for a particular application. As shown in FIG. 7A, an aircraft 90 includes a fuselage 92 that defines a cabin 94 therein. A stores launching system 96, such as a sonobuoy launching system, includes a stores launcher 98, such as a sonobuoy launcher, provided in the cabin 94 and a load-reducing stores launch tube 100, such as a sonobuoy launch tube, operatively coupled to the stores launcher 98 to receive therefrom a store, such as a sonobuoy, and then to eject the store. The load-reducing stores launch tube 100 suitably can include any of the exemplary stores launch tubes described above.

As shown in FIG. 7B, a surface ship 102 includes a hull 104 that defines a cabin 106 therein. A stores launching system 108, such as a sonobuoy launching system or a countermeasures launching system, includes a stores launcher 110, such as a sonobuoy launcher or a countermeasures launcher, provided in the cabin 106 and a load-reducing stores launch tube 112, such as a sonobuoy launch tube or a countermeasures launch tube, operatively coupled to the stores launcher 110 to receive therefrom a store, such as a sonobuoy or a countermeasure, and then to eject the store. The load-reducing stores launch tube 112 suitably can include any of the exemplary stores launch tubes described above.

As shown in FIG. 7C, a submarine 114 includes a pressure hull 105 that defines a cabin 106 therein. An outer (non-pressure) hull 105A defines an outer mold line. A stores launching system 108, such as a sonobuoy launching system or a countermeasures launching system, includes a stores launcher 110, such as a sonobuoy launcher or a countermeasures launcher, provided in the cabin 106 and a load-reducing stores launch tube 112, such as a sonobuoy launch tube or a countermeasures launch tube, operatively coupled to the stores launcher 110 to receive therefrom a store, such as a sonobuoy or a countermeasure, and then to eject the store. The load reducing stores launch tube 112 suitably can include any of the exemplary stores launch tubes described above.

Figure 8:
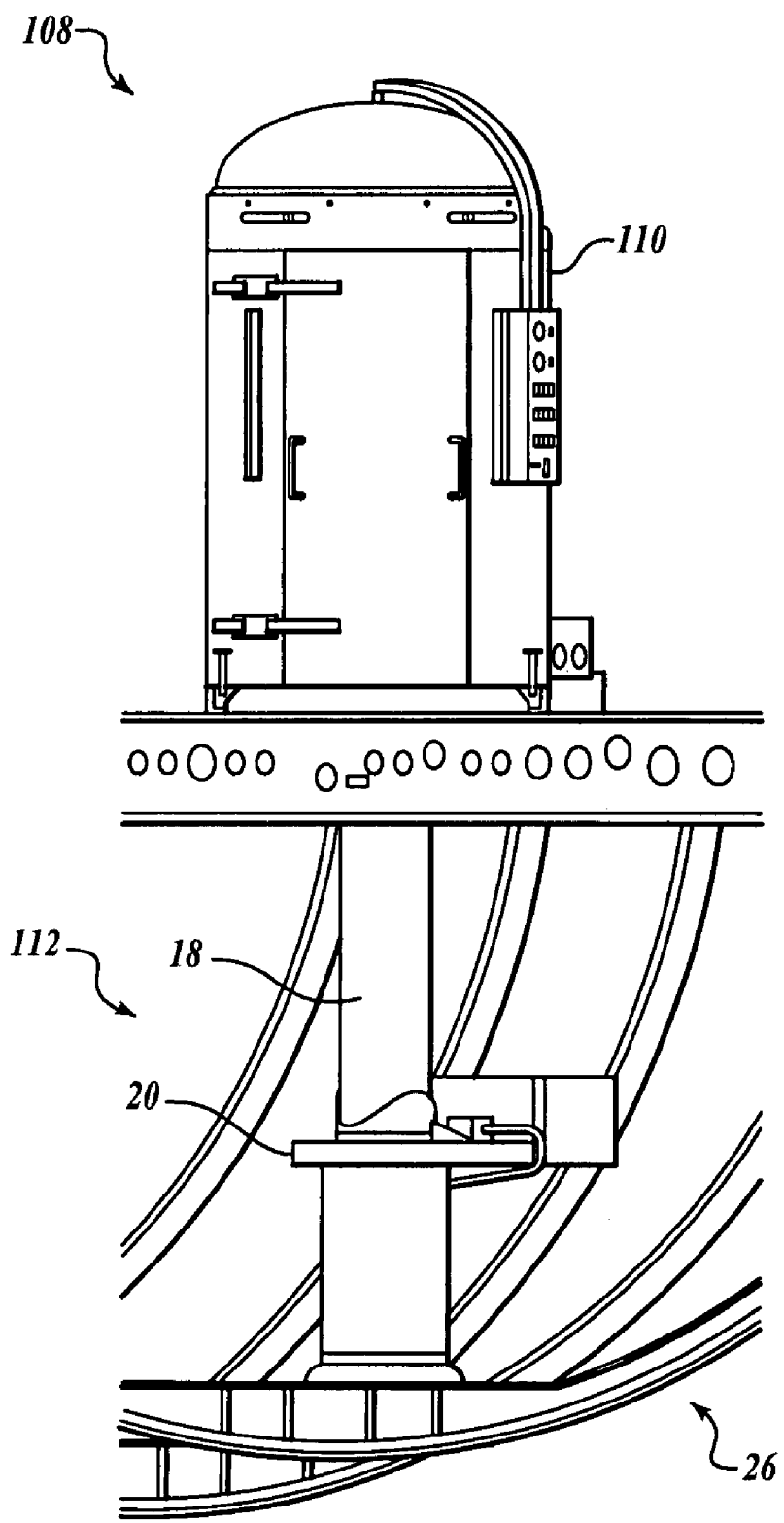
FIG. 8 illustrates an exemplary stores launch system.

Referring now to FIG. 8, the stores launching system 108 includes the stores launcher 110. The stores launcher can be any suitable, known stores launcher. Given by way of non-limiting example, the stores launch may be a rotary sonobuoy launcher as described in U.S. Pat. No. 7,093,802 or a radial sonobuoy launcher as described in U.S. Pat. No. 6,679,454, or any well-known single-load stores launcher, such as a countermeasures launcher. The stores may include a sonobuoy, a countermeasure, a smoke canister, a SUS canister, or other type of store as desired.

While a number of exemplary embodiments and aspects have been illustrated and discussed above, those of skill in the art will recognize certain modifications, permutations, additions, and sub-combinations thereof. It is therefore intended that the following appended claims and claims hereafter introduced are interpreted to include all such modifications, permutations, additions, and sub-combinations as are within their true spirit and scope.

What is claimed is:

1. A stores launch tube comprising: an outer tube; an inner tube disposed interior the outer tube and configured to reduce load as a store exits therefrom; and a retention ring configured to secure a first end of the inner tube to a first end of the outer tube; and the inner tube is flexibly coupled to the outer tube to permit the inner tube to move or deform relative to the outer tube to reduce the load as the store exits therefrom; and the inner tube includes a flexible material; and the first end of the inner tube includes an inner tube upper flange and the first end of the outer tube includes an outer tube upper flange; and the retention ring secures the inner tube upper flange against the outer tube upper flange.

2. The launch tube of claim 1, further comprising at least one load reducing device disposed between the inner tube and the outer tube.

3. The launch tube of claim 2, wherein the load-reducing device includes a device chosen from one of a spring and a jet.

4. The launch tube of claim 3, wherein the jet is a fluid jet.

5. The launch tube of claim 2, wherein the load-reducing device includes a spring-like material.

6. The launch tube of claim 5, wherein the spring-like material is a foam.

7. The launch tube of claim 1, wherein a first load-reducing device is disposed between an upper portion of the inner tube and the outer tube.

8. The launch tube of claim 7, wherein a second load-reducing device is disposed between a lower portion of the inner tube and the outer tube at a radial position that is around 180 degrees from the first load-reducing device.

9. The launch tube of claim 7, wherein a second load reducing device is disposed between a lower portion of the inner tube and the outer tube.

10. The launch tube of claim 9, further comprising a third load reducing device disposed between the inner tube and the outer tube.

11. The launch tube of claim 10, wherein the third load reducing device is disposed between the first load reducing device and the second load reducing device.

12. The launch tube of claim 1, wherein the inner tube is attached directly to the outer tube.

13. The launch tube of claim 1, wherein the outer tube has a substantially circular cross-section.

14. The launch tube of claim 1, wherein the outer tube has a substantially oval cross-section.

15. The launch tube of claim 1, wherein the retention ring is an indexed retention ring.

16. The launch tube of claim 1, wherein the retention ring is secured to the outer tube by a fastener.

17. The launch tube of claim 1, wherein the inner tube is longitudinally stationary with respect to the outer tube.

18. A stores launch system comprising: a stores launcher configured to eject stores therefrom; and a stores launch tube operatively coupled to the stores launcher and configured to receive from the stores launcher a store ejected therefrom, the stores launch tube including: an outer tube; an inner tube disposed interior the outer tube and configured to reduce load as a store exits therefrom; wherein a first end of the inner tube includes an inner tube upper flange and a first end of the outer tube includes an outer tube upper flange; and a retention ring configured to secure the inner tube upper flange against the outer tube upper flange.

19. The launch system of claim 18, wherein the launcher includes a rotary stores launcher.

20. The launch system of claim 18, wherein the launcher includes a single load stores launcher.

21. The launch system of claim 18, wherein the stores include a sonobuoy.

22. The launch system of claim 18, wherein the stores include a store chosen from a countermeasure, a smoke canister, and a SUS canister.

23. An aircraft comprising: a fuselage that defines a cabin therein; and a stores launch system including: a stores launcher disposed at least partially within the cabin and configured to eject stores therefrom; and a stores launch tube operatively coupled to the stores launcher and configured to receive from the stores launcher a store ejected therefrom, the stores launch tube including: an outer tube; an inner tube disposed interior to the outer tube and configured to reduce load as a store exits therefrom; and a retention ring configured to secure a first end of the inner tube to a first end of the outer tube; and the first end of the inner tube includes an inner tube upper flange and the first end of the outer tube includes an outer tube upper flange; and the retention ring is configured to secure the inner tube upper flange against the outer tube upper flange.

24. The aircraft of claim 23, wherein the inner tube is longitudinally stationary with respect to the outer tube.

25. The aircraft of claim 23, further comprising at least one load reducing device disposed between the inner tube and the outer tube.

* * * * *